United States Patent
Lim et al.

(10) Patent No.: US 11,436,115 B2
(45) Date of Patent: Sep. 6, 2022

(54) TEST METHOD OF TEST PLAN

(71) Applicant: Delta Electronics (Thailand) Public Company Limited, Samutprakarn (TH)

(72) Inventors: Chin Huat Lim, Samutprakarn (TH); Ming-Li Shiu, Samutprakarn (TH); Adisak Paepoot, Samutprakarn (TH); Narut Udomchoke, Samutprakarn (TH)

(73) Assignee: DELTA ELECTRONICS (THAILAND) PUBLIC COMPANY LIMITED, Samutprakarn (TH)

( * ) Notice: Subject to any disclaimer, the term of this patent is extended or adjusted under 35 U.S.C. 154(b) by 0 days.

(21) Appl. No.: 16/541,567

(22) Filed: Aug. 15, 2019

(65) Prior Publication Data

US 2020/0250057 A1 Aug. 6, 2020

(30) Foreign Application Priority Data

Jan. 31, 2019 (TW) .................................. 108103803

(51) Int. Cl.
*G06F 11/00* (2006.01)
*G06F 11/263* (2006.01)
(Continued)

(52) U.S. Cl.
CPC ........ *G06F 11/263* (2013.01); *G06F 11/2236* (2013.01); *G06F 11/2273* (2013.01);
(Continued)

(58) Field of Classification Search
CPC ............. G06F 11/2236; G06F 11/2273; G06F 11/263; G06F 11/3058; G06F 11/3684;
(Continued)

(56) References Cited

U.S. PATENT DOCUMENTS 8,191,048 B2   5/2012  Parthasarathy et al.
9,223,915 B1  12/2015  Ginetti et al.
(Continued)

FOREIGN PATENT DOCUMENTS

CN   101251798 A   8/2008
CN   102679925 A   9/2012
(Continued)

*Primary Examiner* — Joseph D Manoskey
(74) *Attorney, Agent, or Firm* — Kirton McConkie; Evan R. Witt

(57) ABSTRACT

The present disclosure discloses a design and test method of a test plan. The test plan includes the plurality of input parameters, the plurality of output parameters, the plurality of system parameters, all of the numerical levels or the types of each input parameter, each output parameter and each system parameter. The test plan includes a plurality of test cases to cover combination conditions including a great number of the input parameters, the output parameters and the system parameters and their dynamic cross of the parameters. The design and test method performs the test cases of the test plan on the product automatically by considering overall possibly parameters and their levels associated with the product. The overall possibly parameters and their levels associated with the product can be tested before the product is dispatched to the customer so as to enhance the product quality.

10 Claims, 18 Drawing Sheets

(51) Int. Cl.
  *G06F 11/22* (2006.01)
  *G06F 11/36* (2006.01)
  *G06F 11/30* (2006.01)
(52) U.S. Cl.
  CPC ...... *G06F 11/3058* (2013.01); *G06F 11/3684* (2013.01); *G06F 11/3688* (2013.01); *G06F 11/3692* (2013.01)
(58) Field of Classification Search
  CPC ... G06F 11/3688; G06F 11/3692; G06F 11/26
  See application file for complete search history.

(56) References Cited

U.S. PATENT DOCUMENTS

| | | | |
|---|---|---|---|
| 2002/0051127 | A1 | 5/2002 | Yoshizawa et al. |
| 2006/0010426 | A1* | 1/2006 | Lewis ................. G06F 11/3684 717/124 |
| 2006/0281199 | A1 | 12/2006 | Matsushita |
| 2008/0240369 | A1* | 10/2008 | Allen ...................... H04M 3/28 379/27.04 |
| 2009/0077538 | A1* | 3/2009 | Keyes ................. G06F 11/3684 717/124 |
| 2010/0083053 | A1* | 4/2010 | Narayanan .......... G06F 11/3684 714/46 |
| 2015/0378875 | A1* | 12/2015 | Sivanesan .......... G06F 11/3684 717/124 |
| 2018/0239692 | A1* | 8/2018 | Kalyanasundram ........................ G06F 11/3696 |

FOREIGN PATENT DOCUMENTS

| | | |
|---|---|---|
| CN | 103135004 A | 6/2013 |
| CN | 103737877 A | 4/2014 |
| CN | 103793612 A | 5/2014 |
| CN | 104461863 A | 3/2015 |
| CN | 105095538 A | 11/2015 |
| TW | 200534147 A | 10/2005 |
| TW | 200837593 A | 9/2008 |
| TW | 201107763 A | 3/2011 |
| TW | 201502989 A | 1/2015 |

* cited by examiner

```
┌─────────────────────────────────────────────────────────┐
│ A plurality of input parameters received by the input   │
│ port, a plurality of output parameters outputted from   │── S1
│ the output port and a plurality of system parameters    │
│ associated with the characteristics of the test system  │
│ provided by the system unit are accessed.               │
└─────────────────────────────────────────────────────────┘
                            ↓
┌─────────────────────────────────────────────────────────┐
│ A standard orthogonal array is selected according to    │
│ the number of the plurality of input parameters, the    │
│ number of the plurality of output parameters, the       │
│ number of the plurality of system parameters, the number│
│ of the numerical level or the type of each input        │
│ parameter, the number of the numerical level or the     │
│ type of each output parameter and the number of the     │
│ numerical level or the type of each system parameter,   │
│ wherein the selected standard orthogonal array          │
│ comprises a plurality of original columns and a         │── S2
│ plurality of original rows. Then, the selected standard │
│ orthogonal array is edited or converted to a conversion │
│ orthogonal array. Thereafter, a test plan is designed   │
│ and created according to the conversion orthogonal      │
│ array, wherein the test plan comprises the plurality of │
│ input parameters, the plurality of output parameters,   │
│ the plurality of system parameters, every numerical     │
│ level or every type of each input parameter, every      │
│ numerical level or every type of each output parameter  │
│ and every numerical level or every type of each system  │
│ parameter.                                              │
└─────────────────────────────────────────────────────────┘
                            ↓
┌─────────────────────────────────────────────────────────┐
│ A corresponding execution program is developed and      │
│ created according to each test case of the test plan.   │
│ Then, each execution program is executed, so that the   │
│ at least one test case of the test plan including the   │
│ plurality of input parameters, the plurality of output  │
│ parameters, the plurality of system parameters, each    │── S3
│ numerical level or each type of each input parameter,   │
│ each numerical level or each type of each output        │
│ parameter and each numerical level or each type of each │
│ system parameter is performed on the product. After each│
│ execution program is executed, an operation data and a  │
│ state report of the product are collected.              │
└─────────────────────────────────────────────────────────┘
                            ↓
┌─────────────────────────────────────────────────────────┐
│ A test result is created according to the plurality of  │
│ operation data and the plurality of state reports.      │── S4
│ Then, the test result is visible to obtain the test     │
│ analysis and the default analysis of the product.       │
└─────────────────────────────────────────────────────────┘
```

FIG. 1

|  | Factor | No. of levels | Levels |
|---|---|---|---|
| Input parameter | F11 | 2 | X, X |
|  | F12 | 4 | X, X, X, X |
|  | F13 | 4 | X, X, X, X |
|  | F14 | 2 | X, X |
|  | F15 | 4 | X, X, X, X |
|  | F16 | 4 | X, X, X, X |
|  | F17 | 2 | X, X |
|  | F18 | 4 | X, X, X, X |
| Output parameter | F21 | 4 | X, X, X, X |
|  | F22 | 2 | X, X, |
|  | F23 | 8 | X, X, X, X, X, X, X, X |
|  | F24 | 4 | X, X, X, X |
|  | F25 | 4 | X, X, X, X |
|  | F26 | 4 | X, X, X, X |
|  | F27 | 2 | X, X |
| System parameter | F31 | 4 | X, X, X, X |
| Total Number | 16 |  |  |

FIG. 3A

|  | 8-level factors | 4-level factors | 2-level factors |
|---|---|---|---|
| Number of factors | 1 | 10 | 5 |
| Parameter level | 8 (first parameter level) | 4 (second parameter level) | 2 (third parameter level) |
| DOF | 1*(8-1)=7 | 10*(4-1)=30 | 5*(2-1)=5 |
| Sum of DOF | 7+30+5=42 |||

FIG. 3B

| Orthogonal array | Number of rows | Maximum number of factors | Maximum number of columns at these levels | | | |
|---|---|---|---|---|---|---|
| | | | 2 | 3 | 4 | 5 |
| $L_4$ | 4 | 3 | 3 | - | - | - |
| $L_8$ | 8 | 7 | 7 | - | - | - |
| $L_9$ | 9 | 4 | - | 4 | - | - |
| $L_{12}$ | 12 | 11 | 11 | - | - | - |
| $L_{16}$ | 16 | 15 | 15 | - | - | - |
| $L_{18}$ | 18 | 8 | 1 | 7 | - | - |
| $L_{27}$ | 27 | 13 | - | 13 | - | - |
| $L_{32}$ | 32 | 31 | 31 | - | - | - |
| $L_{36}$ | 36 | 23 | 11 | 12 | - | - |
| $L_{54}$ | 54 | 26 | 1 | 25 | - | - |
| $L_{64}$ | 64 | 63 | 63 | - | - | - |
| $L_{81}$ | 81 | 40 | - | 40 | - | - |

|    | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|----|----|----|----|----|----|----|----|----|----|----|----|----|----|----|----|----|----|----|----|----|----|----|----|----|----|----|----|----|----|----|----|
| 33 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 34 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 35 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 36 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 37 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 38 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 39 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 40 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 41 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 42 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 43 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 44 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 45 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 46 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 47 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 48 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 49 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 50 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 51 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 52 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 53 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 54 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 55 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 56 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 57 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 58 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 59 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 60 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 61 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 62 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |
| 63 | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  |
| 64 | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  | 2  | 1  |

|  | | columns | | | | | | | | | | | | | | | |
|---|---|---|---|---|---|---|---|---|---|---|---|---|---|---|---|---|---|
|  | | 1 | 2 | 3 | 4 | 5 | 6 | 7 | 8 | 9 | 10 | 11 | 12 | 13 | 14 | 15 | 16 |
| rows | 1 | 1 | . | . | . | . | . | . | . | . | . | . | . | . | . | . | . |
|  | 2 | 1 | . | . | . | . | . | . | . | . | . | . | . | . | . | . | . |
|  | 3 | 1 | . | . | . | . | . | . | . | . | . | . | . | . | . | . | . |
|  | 4 | 1 | . | . | . | . | . | . | . | . | . | . | . | . | . | . | . |
|  | 5 | 2 | . | . | . | . | . | . | . | . | . | . | . | . | . | . | . |
|  | . | . | . | . | . | . | . | . | . | . | . | . | . | . | . | . | . |
|  | 64 | 2 | . | . | . | . | . | . | . | . | . | . | . | . | . | . | . |

FIG. 3F

| Test case No. | Parameters (factors) | | | 
|---|---|---|---|
| | Input parameters | Output parameters | System parameters |
| | F11 F12 F13 F14 F15 F16 F17 F18 | F21 F22 F23 F24 F25 F26 F27 | F31 |
| 1 | X X X X X X X X | X X X X X X X | X X |
| 2 | X X X X X X X X | X X X X X X X | X X |
| 3 | X X X X X X X X | X X X X X X X | X X |
| 4 | X X X X X X X X | X X X X X X X | X X |
| 5 | X X X X X X X X | X X X X X X X | X X |
| . | . | . | . |
| 64 | X X X X X X X X | X X X X X X X | X X |

FIG. 3G

TEST METHOD OF TEST PLAN

FIELD OF THE DISCLOSURE

The present disclosure relates to a test method, and more particularly to a design and test method of a test plan for testing a product.

BACKGROUND OF THE DISCLOSURE

Before a product is developed and dispatched to the customer, a variety of test cases are required to be implemented on the product by a test system. Consequently, the characteristics and functions of the product are verified to ensure the quality of the product.

When the product is tested, some operation parameters associated with the product are required for performing the test cases. If the test cases are performed on the product by considering all of the parameters associated with the product under operation and all of the levels of the parameters (i.e. exhaustive testing), the quality of the product can be assessed comprehensively. However, various combinations of the parameters and the levels of the parameters form a large number of different test conditions for the test cases. It is impossible to perform all test cases with different test conditions on the product under limited resources and time. Moreover, the effects of the test cases with complex test conditions upon the product quality are unknown or difficult to know before testing. Therefore, when a test plan is created and performed, it is difficult to determine what test cases with different test conditions should be selected and performed under limited resources and time.

Moreover, the test system performs each test case on the product by selecting portion of the parameters and portion of the levels of the parameters as the test condition. After the test case is performed by the test system, the test system performs a next test case on the product by selecting the other parameters and the other levels of the parameters as the test condition. If all of the test cases, which have various test conditions covering all of the parameters and all of the levels of the parameters, are required to be performed by the test system, it may take longer time to wait the test result for each test case. Therefore, the traditional test method selects some specific parameters from all of the parameters for the test cases to save test time. For example, the specific parameters of a four corner test method may be a maximum withstand voltage of the product, a minimum withstand voltage of the product, a maximum withstand current of the product and a minimum withstand current of the product. However, the traditional test method fails to cover all of the parameters associated with the product and all of the levels of the parameters for performing the test cases. Consequently, the quality and performance of the product to be applied to the client's application cannot be ensured.

Moreover, taking an electronic product as an example, the numbers of the microprocessor and the firmware in the product are increased, so that the numbers of the parameters and the numbers of the levels of the parameters associated with the product are increased and more complicated accordingly. The traditional test method only selecting some specific parameters from all of the parameters for performing the test cases is hard to ensure the probability of product anomalies or malfunctions in the market.

Therefore, there is a need of providing a design and test method of a test plan so as to overcome the drawbacks of the conventional technologies.

SUMMARY OF THE DISCLOSURE

An object of the present disclosure provides a design and test method of a test plan for testing a product so as to reduce the probability of various quality issues occurring on the product after the product is applied to the client's application. The method of the present disclosure can create the test plan having optimal test cases to cover all possible parameters and their levels.

In accordance with an aspect of the present disclosure, a design and test method of a test plan is provided. The design and test method is performed on a product by a test system. The design and test method of the test plan comprises the following steps. In the step (a), a plurality of input parameters received by the test system, a plurality of output parameters outputted by the test system and a plurality of system parameters associated with characteristic of the test system are accessed. Each of the plurality of input parameters, the plurality of output parameters and the plurality of system parameters comprises at least one numerical level or at least one type and comprises a corresponding parameter level according to the number of the numerical level or the number of the type thereof, respectively. In the step (b), a standard orthogonal array is selected according to the number of the plurality of input parameters, the number of the plurality of output parameters, the number of the plurality of system parameters, the number of the numerical level or the type of each of the input parameters, the number of the numerical level or the type of each of the output parameters and the number of the numerical level or the type of each of the system parameters. The selected standard orthogonal array is edited and converted to a conversion orthogonal array, and the test plan is created according to the conversion orthogonal array. The test plan comprises the plurality of input parameters, the plurality of output parameters, the plurality of system parameters, every numerical level or every type of each of the input parameters, every numerical level or every type of each of the output parameters and every numerical level or every type of each of the system parameters. The selected standard orthogonal array comprises a plurality of original columns and a plurality of original rows. The test plan comprises at least one test case, which comprises the corresponding input parameter, the corresponding output parameter, the corresponding system parameter, the corresponding numerical level or the type of each of the input parameters, the corresponding numerical level or the type of each of the output parameters and the corresponding numerical level or the type of each of the system parameters. In the step (c), a corresponding execution program is created according to each of the test case of the test plan and each of the execution program is executed, so that the test case of the test plan corresponding to the execution program is performed on the product. The test case including the input parameter, the output parameter, the system parameter, the numerical level or the type of each of the input parameters, the numerical level or the type of each of the output parameters and the numerical level or the type of each of the system parameters is performed on the product so as to obtain and collect an operation data and a state report of the product. In the step (d), a test result is created according to the operation data and the state report, and the test result is allowed to be visible so as to obtain a test analysis and a default analysis of the product.

The above contents of the present disclosure will become more readily apparent to those ordinarily skilled in the art after reviewing the following detailed description and accompanying drawings, in which:

BRIEF DESCRIPTION OF THE DRAWINGS

FIG. 1 is a flowchart illustrating a design and test method of a test plan according to an embodiment of the present disclosure;

FIG. 3A is a table showing the relationships between the parameters and their levels associated with a product to be tested according to an embodiment of the present invention;

FIG. 3B is a table showing the relationships between the parameters of FIG. 3A and their degree-of-freedom;

FIG. 3C is a table showing well-known standard orthogonal arrays that are used in an embodiment of the present invention;

FIGS. 3D-1 through 3D-4 form a standard orthogonal array selected from the arrays of FIG. 3C;

FIGS. 3E-1 through 3E-4 form an interaction table for the selected standard orthogonal array of FIGS. 3D-1 through 3D-4;

FIG. 3F is an exemplary conversion orthogonal array edited or converted from the selected standard orthogonal array of FIGS. 3D-1 through 3D-4;

FIG. 3G is a table showing an exemplary test plan having a plurality of test cases obtained by using the conversion orthogonal array of FIG. 3F;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
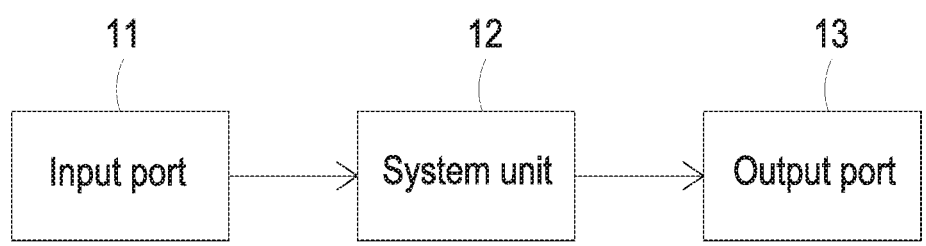
FIG. 2 is a schematic block diagram illustrating a test system applied to the design and test method of FIG. 1.

FIG. 1 is a flowchart illustrating a design and test method of a test plan according to an embodiment of the present disclosure. FIG. 2 is a schematic block diagram illustrating a test system applied to the design and test method of FIG. 1. As shown in FIGS. 1 and 2, the design and test method of the test plan of the present disclosure is applied to a test system 1 of FIG. 2. The test system 1 is an actual system or a simulation system. In case that the test system 1 is the actual system, the product is directly applied to the test system 1 for performing the test. In case that the test system 1 is the simulation system, the test results of the product applied to the actual system are simulated by the simulation system. The test system 1 includes an input port 11, a system unit 12 and an output port 13.

The input port 11 receives a plurality of input parameters (i.e. factors). Each input parameter has at least one numerical level or at least one type. Each input parameter has a parameter level based on the number of the numerical level or the number of the type. In an example, the product to be tested is a power supply. The input parameter is an input voltage, and the requirement of the input voltage includes four numerical levels such as 180V, 208V, 230V and 264V. The parameter level of the input parameter (i.e. the input voltage) is four based on the four numerical levels of the input parameters (i.e. 180V, 208V, 230V and 264V). Namely, the input voltage is a 4-level factor. It is noted that the terms "parameter" and "factor" are used interchangeably hereinafter. In another example, the input parameter is a switching mode of a switch of the power supply disposed in the test system 1, and the switching mode of the switch includes a turn-on mode and a turn-off mode. The parameter level of the input parameter (i.e. the switching mode of the switch of the power supply) is two based on the two different modes of the input parameter (i.e. the turn-on mode and the turn-off mode). Namely, the switching mode of the switch is a 2-level factor. In some embodiments, the input parameter includes but not limited to input source, input mode, input voltage, swing rate, turn-on time, turn-off time, switch cycle, switch mode of the switch of the power supply or input frequency. In some other embodiments, the input parameter of the other product includes but not limited to communication parameter, type of programmable logic controller cooperated with the product, type of motor cooperated with the product, variety of the utility power, environment temperature or water temperature.

The system unit 12 is connected with the input port 11 for receiving the plurality of input parameters from the input port 11. The system unit 12 provides a plurality of system parameters (i.e. factors) associated with characteristics of the test system 1. In this embodiment, each system parameter includes at least one numerical level or at least one type. Each system parameter includes a parameter level based on the number of the numerical level or the number of the type. For example, the system parameter is temperature of the test system 1, and the requirement of the temperature of the test system 1 includes four numerical levels such as 27° C., 40° C., 55° C. and −5° C. The parameter level of the system parameter (i.e. the temperature of the test system 1) is four based on the four numerical levels of the system parameter (i.e. 27° C., 40° C., 55° C. and −5° C.). Namely, the temperature of the test system 1 is a 4-level factor. The above temperature of the system parameter is set up with stable numerical levels. In some embodiments, the practical system parameter includes but not limited to the continuous variety temperature mode or cycle mode of warming up and cooling down. In some other embodiments, each system parameter is a state parameter or an operation parameter. Each system parameter includes but not limited to temperature, length of the power cable, hot-swap parameter or cold-swap parameter.

The output port 13 is connected with the system unit 12 and outputs a plurality of output parameters (i.e. factors). Each output parameter includes at least one numerical level or at least one type. Each output parameter includes a parameter level based on the number of the numerical level or the number of the type. For example, the output parameter is an output mode, and the requirement of the output mode includes four types such as stable mode, step variety mode, oblique variety mode and dynamic variety mode. The parameter level of the output parameter (i.e. the output mode) is four based on the four different types of the output modes (i.e. stable mode, step variety mode, oblique variety mode and dynamic variety mode). Namely, the output mode is a 4-level factor. In some embodiments, each output parameter includes but not limited to output mode, output load or output dynamic condition, wherein the output dynamic condition includes cycle, frequency and current swing rate.

Please refer to FIG. 1 again. The design and test method of the test plan of the present disclosure is described as follows. Firstly, a step S1 is performed. The plurality of input parameters received by the input port 11, the plurality of output parameters outputted from the output port 13 and the plurality of system parameters associated with the characteristics of the test system 1 provided by the system unit 12 are accessed. Preferably but not exclusively, the test system 1 further includes a processing unit (not shown) employed to access the plurality of input parameters, the plurality of output parameters and the plurality of system parameters.

Then, a step S2 is performed. In the step S2, a standard orthogonal array is selected according to the number of the plurality of input parameters, the number of the plurality of output parameters, the number of the plurality of system parameters, the number of the numerical level or the type of each input parameter, the number of the numerical level or the type of each output parameter and the number of the numerical level or the type of each system parameter. The selected standard orthogonal array comprises a plurality of original columns and a plurality of original rows. Then, the selected standard orthogonal array is edited or converted to a conversion orthogonal array. Thereafter, a test plan is designed and created according to the conversion orthogonal array. The test plan comprises the plurality of input parameters, the plurality of output parameters, the plurality of system parameters, every numerical level or every type of each input parameter, every numerical level or every type of each output parameter and every numerical level or every type of each system parameter. Preferably but not exclusively, the step S2 is executed by the processing unit of the test system 1.

In some embodiments, the test system 1 presets a plurality of standard orthogonal arrays. The number of rows and/or the number of columns of one of the standard orthogonal arrays is different with the number of rows and/or the number of columns of the other standard orthogonal array. Preferably, the test system 1 further includes a database (not shown) for pre-storing the plurality of standard orthogonal arrays. In the step S2, the interaction between each original row of the original rows and each original column of the original columns of the selected standard orthogonal array includes an original number. In the step S2, the conversion orthogonal array comprises a plurality of columns and a plurality of rows. In the conversion orthogonal array, the number of the columns is at least equal to a sum of the number of the plurality of input parameters, the number of the plurality of output parameters and the number of the plurality of system parameters, and the number of the rows is equal to the number of the original rows of the selected standard orthogonal array. In the step S2, each one of the input parameters and their levels, the output parameters and their levels and the system parameters and their levels is assigned to the corresponding column of the conversion orthogonal array, so that each row of the conversion orthogonal array construct a test case for the test plan. The test plan includes at least one test case, and the test plan includes the plurality of input parameters, the plurality of output parameters, the plurality of system parameters, each numerical level or each type of each input parameter, each numerical level or each type of each output parameter and each numerical level or each type of each system parameter.

Then, a step S3 is performed. A corresponding execution program is developed and created according to each test case of the test plan. Then, each execution program is executed, so that the test case of the test plan corresponding to the execution program is performed on the product. Consequently, the at least one test case of the test plan including the plurality of input parameters, the plurality of output parameters, the plurality of system parameters, each numerical level or each type of each input parameter, each numerical level or each type of each output parameter and each numerical level or each type of each system parameter is performed on the product. After each execution program is executed, an operation data and a state report of the product are collected. Preferably but not exclusively, the step S3 is performed by the processing unit of the test system 1.

The test system 1 performs one test case including the corresponding input parameter, the corresponding output parameter, the corresponding system parameter, the numerical level or the type of each input parameter, the numerical level or the type of each output parameter and the numerical level or the type of each system parameter on the product by executing the corresponding execution program. The execution programs are executed automatically and successively by the processing unit. Namely, after one execution program is executed, a next execution program is executed automatically. When all test cases of the test plan are performed on the product, all of the input parameters, all of the output parameters, all of the system parameters, all of the numerical levels or the types of each input parameter, all of the numerical levels or the types of each output parameter and all of the numerical levels or the types of each system parameter are utilized to perform the test cases on the product. Consequently, the plurality of test cases are tested on the product by executing the corresponding execution programs so as to obtain a plurality of operation data and a plurality of state reports.

Finally, a step S4 is performed. A test result is created according to the plurality of operation data and the plurality of state reports. The test result is visible to obtain the test analysis and the default analysis of the product. In some embodiments, the test system 1 further includes a display unit (not shown). In the step S4, the visualization of the test result is performed by the display unit.

From above, the method of the present disclosure creates the test plan including at least one test case to cover the plurality of input parameters, the plurality of output parameters, the plurality of system parameters, all of the numerical levels or the types of each input parameter, all of the numerical levels or the types of each output parameter and all of the numerical levels or the types of each system parameter. The test plan is performed on the product to obtain the test analysis and the default analysis of the product. However, the conventional test method performs the test cases on the product by using only some specific parameters. Compared with the conventional test method, the design and test method of the present disclosure does not need to wait the test time for each test case to input the parameters. The design and test method of the present disclosure performs the test cases of the test plan on the product automatically by considering overall possibly parameters and their levels associated with the product. Consequently, the overall possibly parameters and their levels associated with the product can be tested before the product is dispatched to the customer. Therefore, the product quality in the market is enhanced significantly.

In some embodiments, in the selected standard orthogonal array, the number of the original columns is greater or equal to the sum of the number of the input parameters, the number of the output parameters and the number of the system parameters. In addition, a largest level of the original numbers contained in each original column of the selected standard orthogonal array is greater than, lower than or equal to a largest level of the parameter levels of the plurality of input parameters, the plurality of output parameters and the plurality of system parameters. In case that the largest level of the original numbers contained in each original column of the selected standard orthogonal array is greater than or equal to the largest level of the parameter levels of the input parameters, the output parameters and the system parameters, the processing unit determines that the selected standard orthogonal array has sufficient number of original columns having sufficient number of levels to cover all factors having corresponding number of levels. Consequently, at least portion of the original columns of the selected standard orthogonal array are selected and edited to generate the conversion orthogonal array. The plurality of input parameters and their levels, the plurality of output parameters and their levels and the plurality of system parameters and their levels are assigned to the corresponding columns of the conversion orthogonal array, so that each row of the conversion orthogonal array constructs a test case for the test plan. Consequently, the required test plan is created by using the conversion orthogonal array.

In some embodiments, in case that a largest level of the original numbers contained in each original column of the selected standard orthogonal array is lower than the largest level of the parameter levels of the plurality of input parameters, the plurality of output parameters and the plurality of system parameters, the processing unit determines that the selected standard orthogonal array has no sufficient number of original columns having sufficient number of levels to cover the factors having corresponding levels. Consequently, the selected standard orthogonal array should be converted and modified to the conversion orthogonal array by performing the sub-steps of the step S2. For example, the largest level of the original numbers contained in each original column of the selected standard orthogonal array are lower than three or four. However, the parameters and their levels of the product to be tested includes one 8-level factor, ten 4-level factors and five 2-level factors. It is obvious that the selected standard orthogonal array has no sufficient number of 8-level original columns and 4-level original columns to cover one 8-level factor and ten 4-level factors of the product to be tested. The selected standard orthogonal array should be converted to the conversion orthogonal array having at least one 8-level column, at least ten 4-level columns and at least five 2-level columns by performing the sub-steps of the step S2. Then, the plurality of input parameters and their levels, the plurality of output parameters and their levels and the plurality of system parameters and their levels (i.e. one 8-level factor, ten 4-level factors and five 2-level factors) are assigned to the corresponding columns of the conversion orthogonal array (i.e. one 8-level column, ten 4-level columns and five 2-level columns), so that each row of the conversion orthogonal array constructs a test case for the test plan. Consequently, the required test plan is created by using the conversion orthogonal array.

In an embodiment, the product to be tested is a power supply. The input parameters include for example but not limited to input source F11, input mode F12, input voltage F13, swing rate F14, turn-on time F15, turn-off time F16, switch mode of the switch of the power supply F17 and input frequency F18. The output parameters include for example but not limited to output mode F21, load variation F22, main output load F23, auxiliary output load F24, output dynamic duty F25, output dynamic frequency F26 and output dynamic current slew rate F27. The system parameter includes for example but not limited to temperature F31 of the system unit 12. The relationships between above parameters and their respective levels are shown in FIG. 3A. In an embodiment, in the step S2, the processing unit further defines the above parameters and their levels as a factor-and-level table.

In some embodiments, all of the parameter levels of the plurality of input parameters, the plurality of output parameters and the plurality of system parameters include at least one first parameter level, at least one second parameter level and at least one third parameter level. The level of the first parameter level is different from the level of the second parameter level and the level of the third parameter level. The level of the second parameter level is different from the level of the third parameter level. The difference of the level includes but not limited to the difference of numerical level or the difference of the type. For example, as shown in FIG. 3B, the first parameter level is 8, the second parameter level is 4, and the third parameter level is 2.

Figure 3D-1:
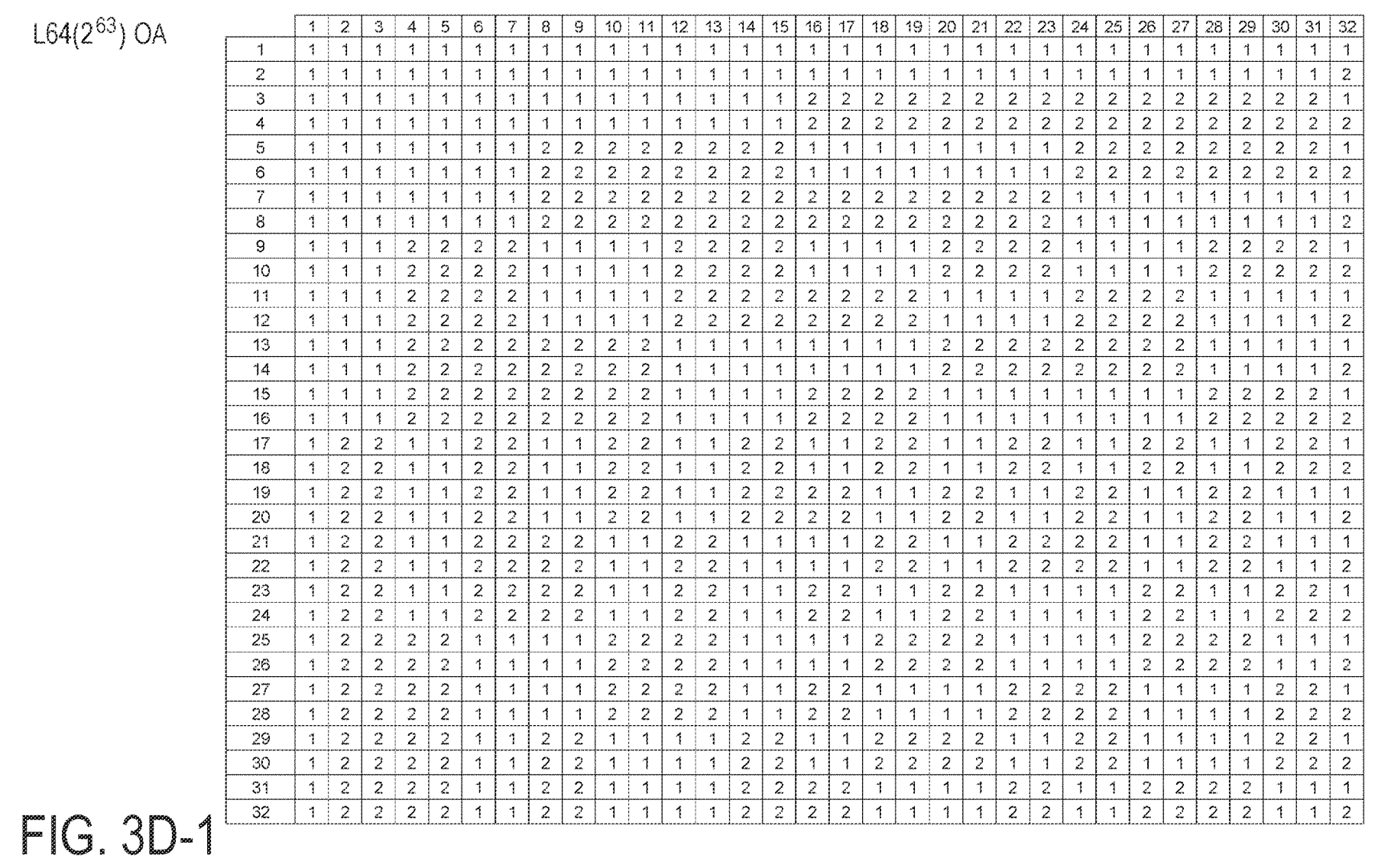
Figure 3D-2:
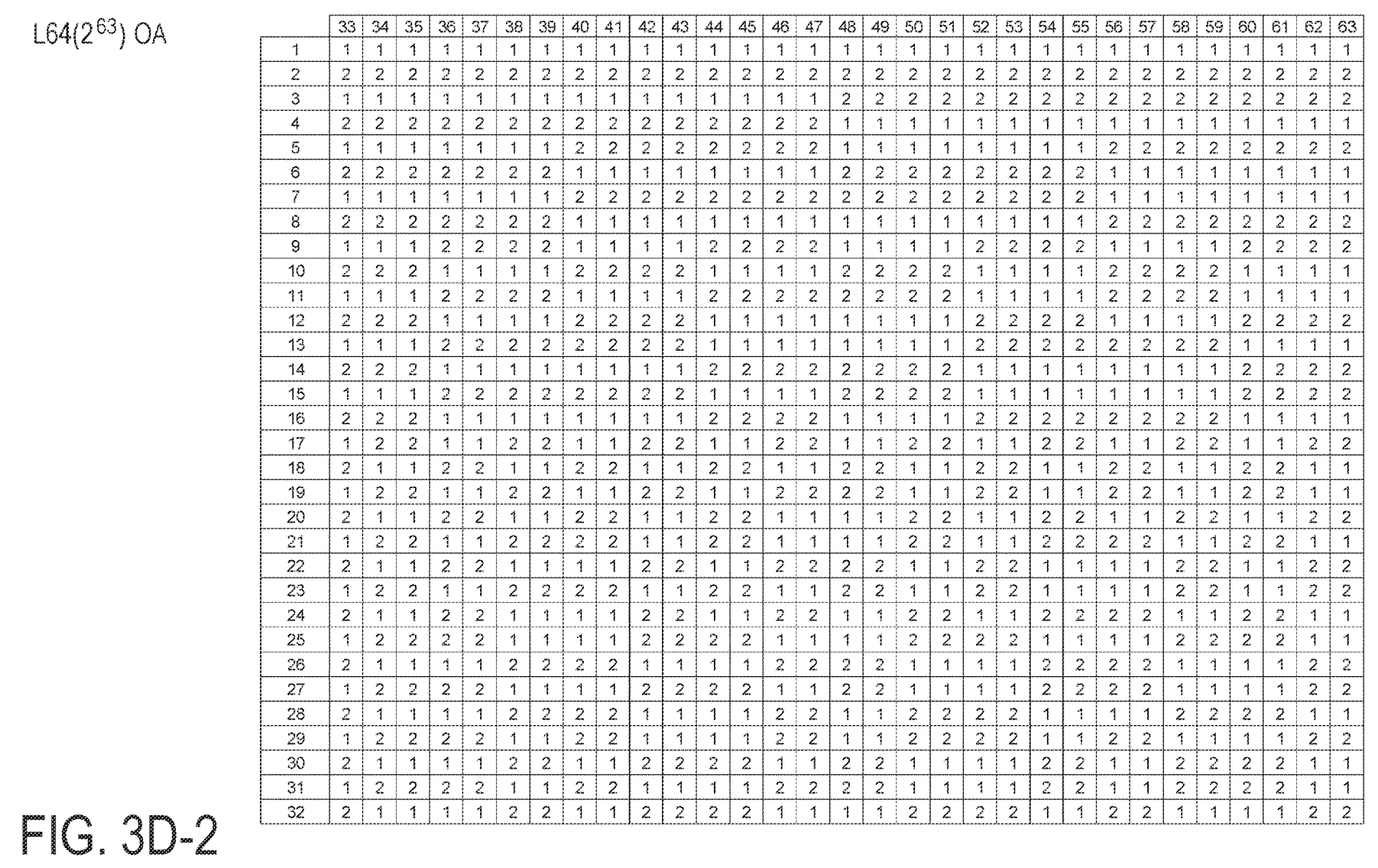
Figure 3D-3:
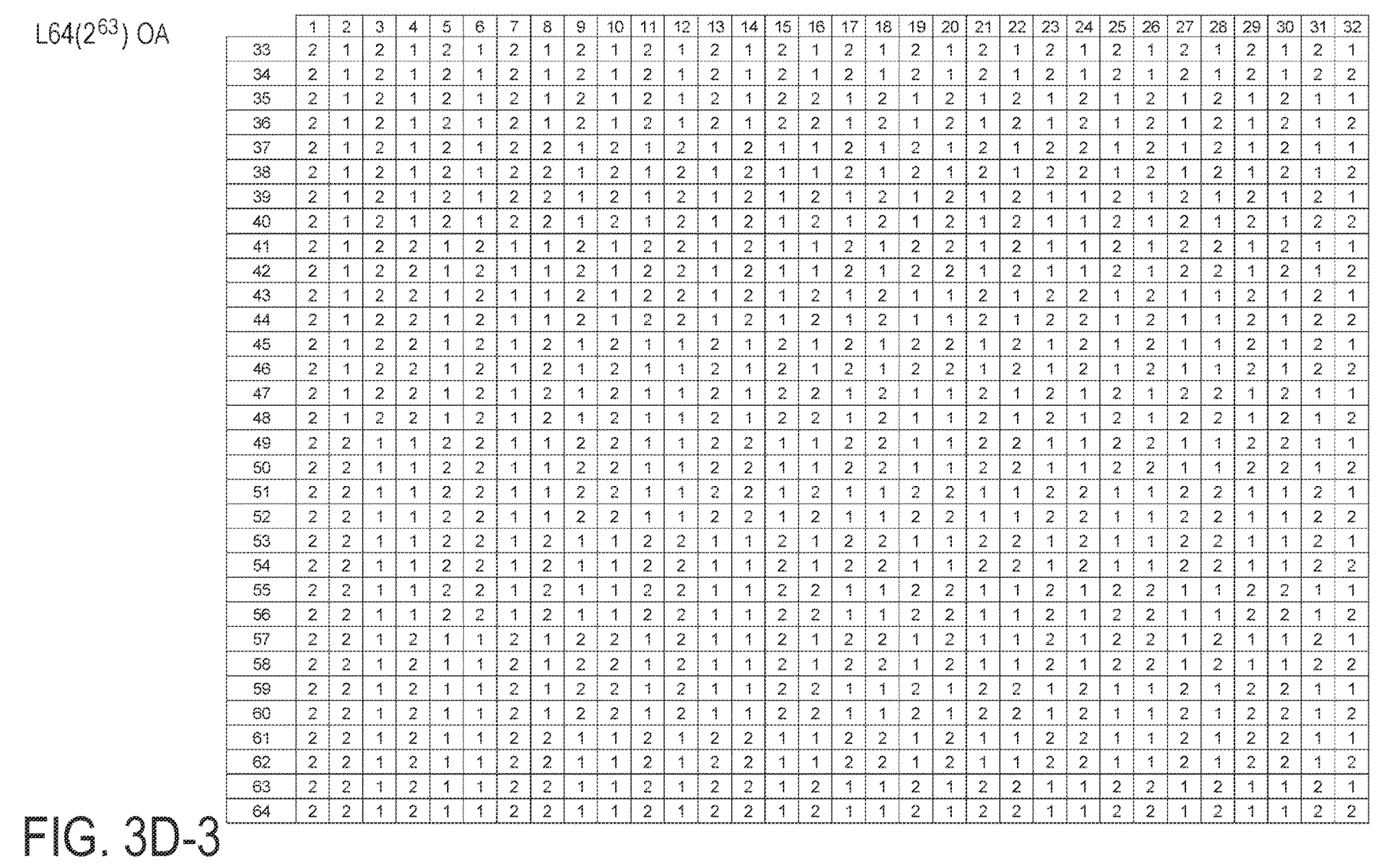
Figure 3E-1:
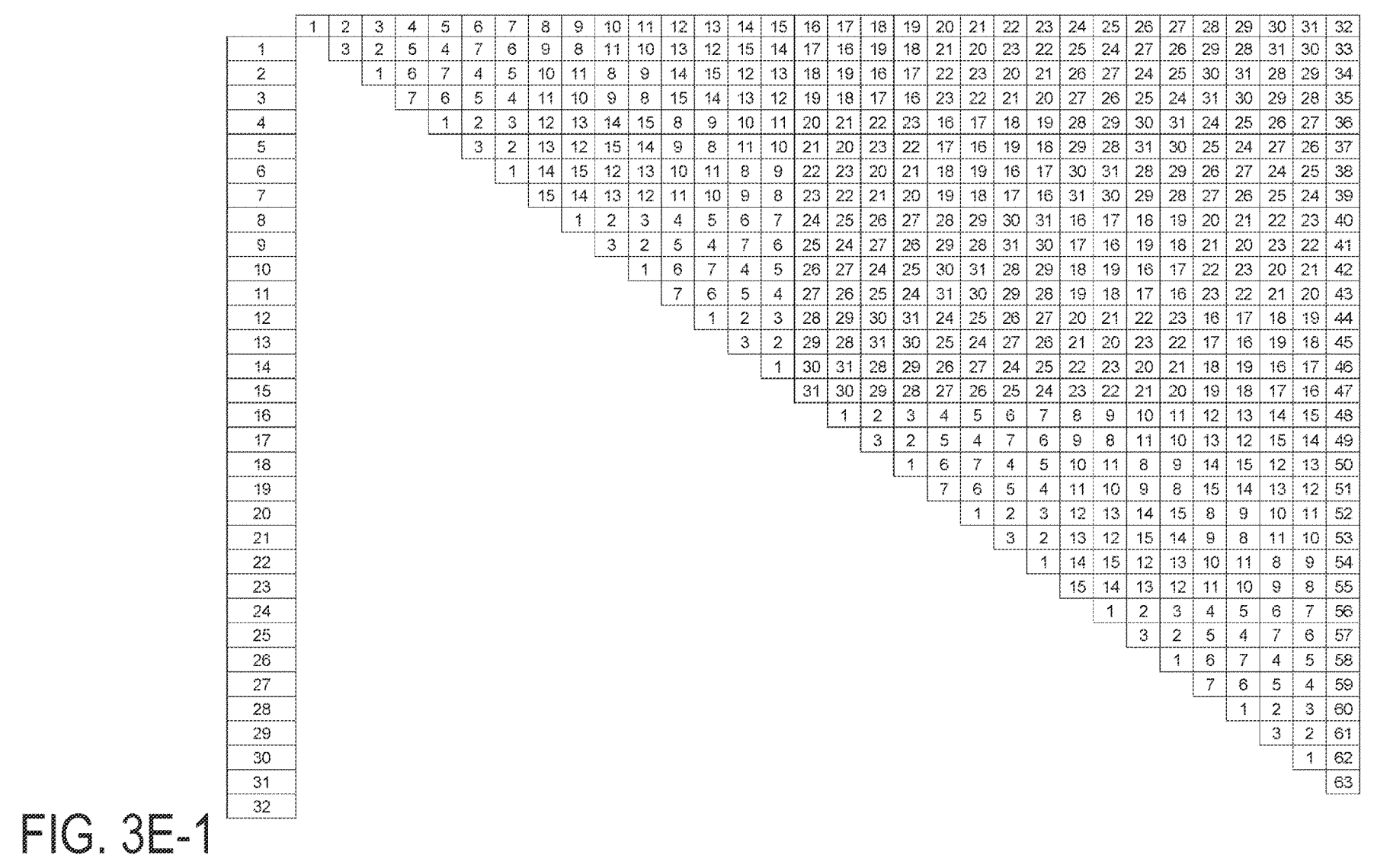
Figure 3E-2:
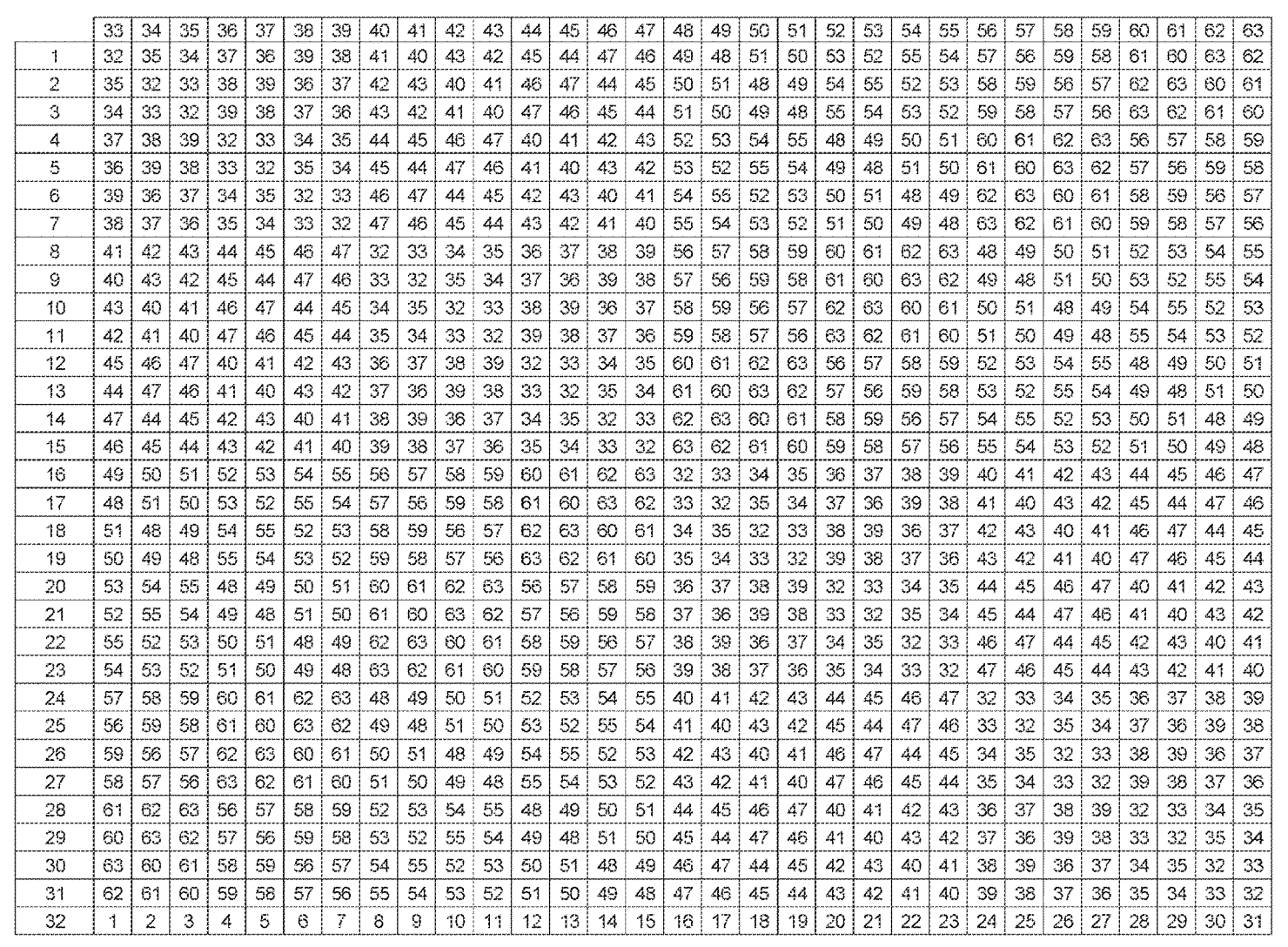
Figure 3E-3:
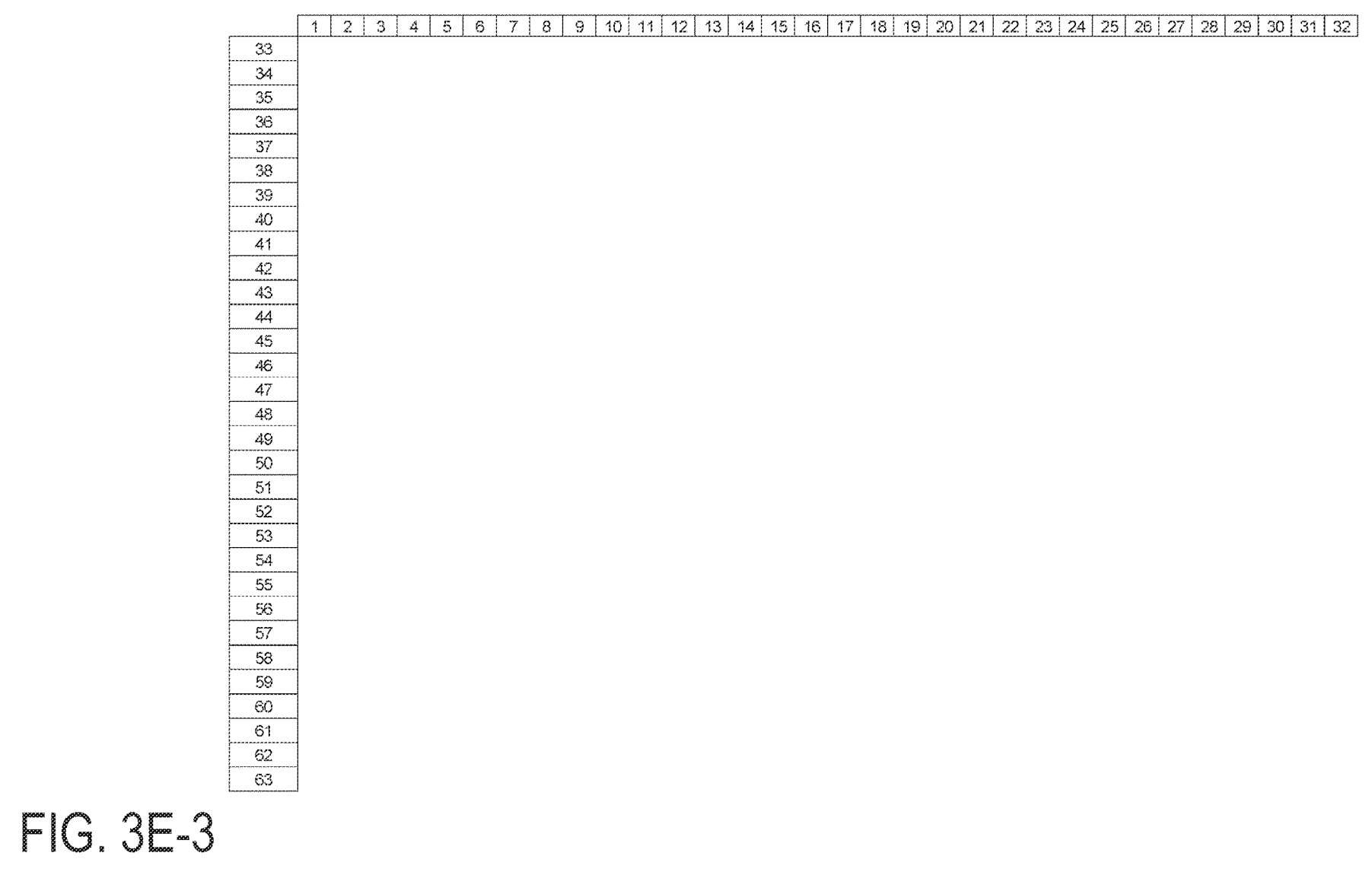
Figure 3E-4:
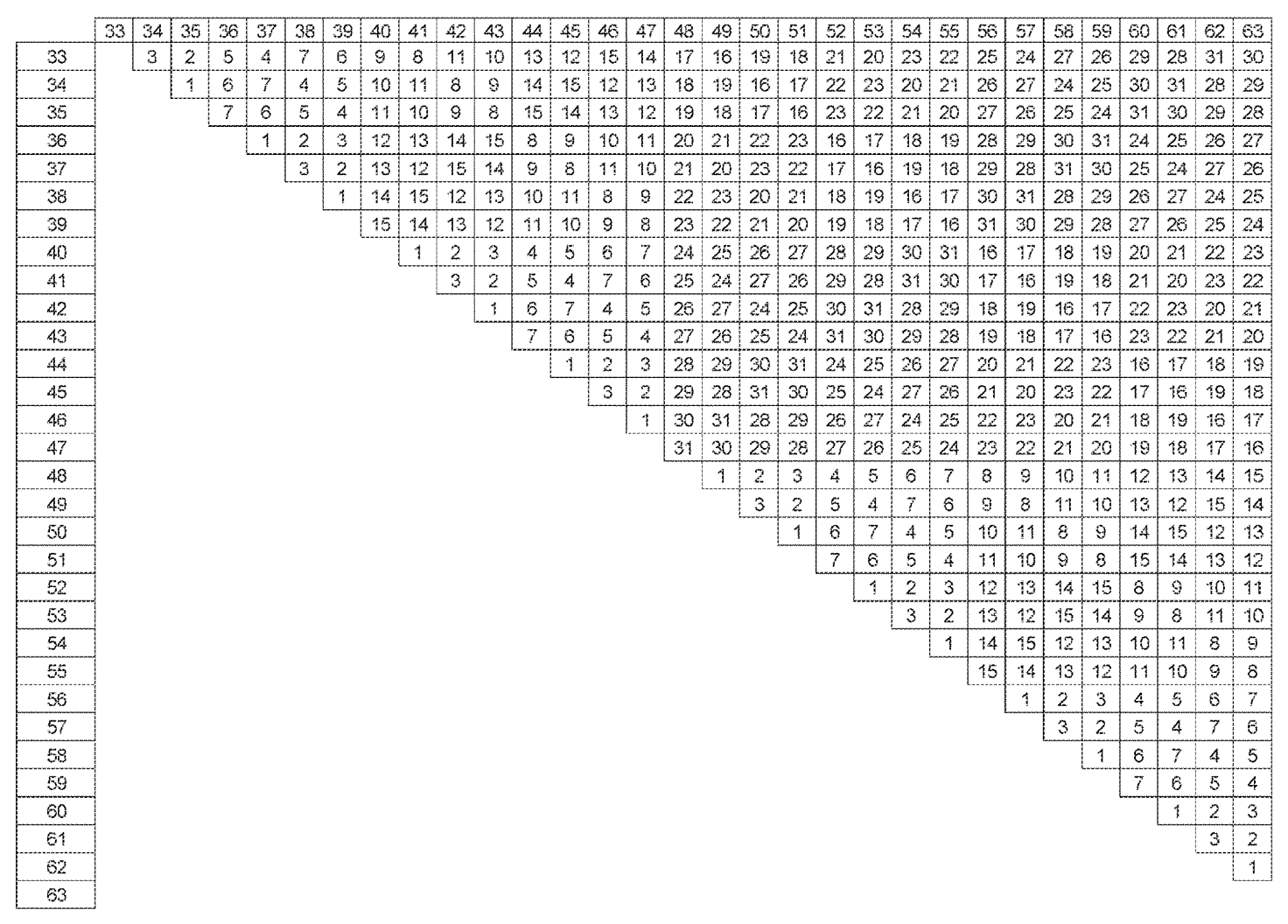
Figure 4A:
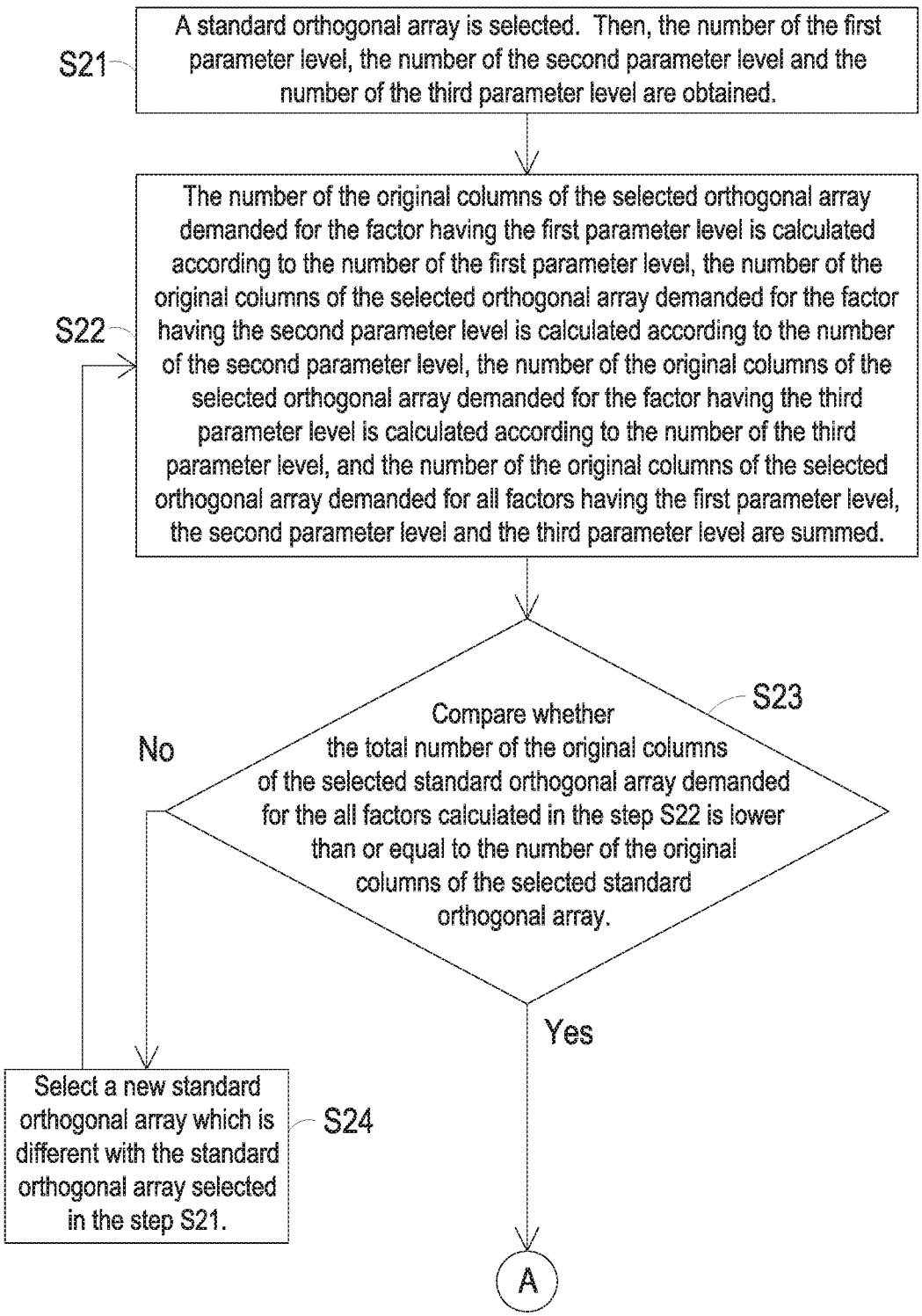
FIGS. 4A and 4B are flowcharts illustrating the sub-steps of the step S2 of FIG. 1.
Figure 4B:
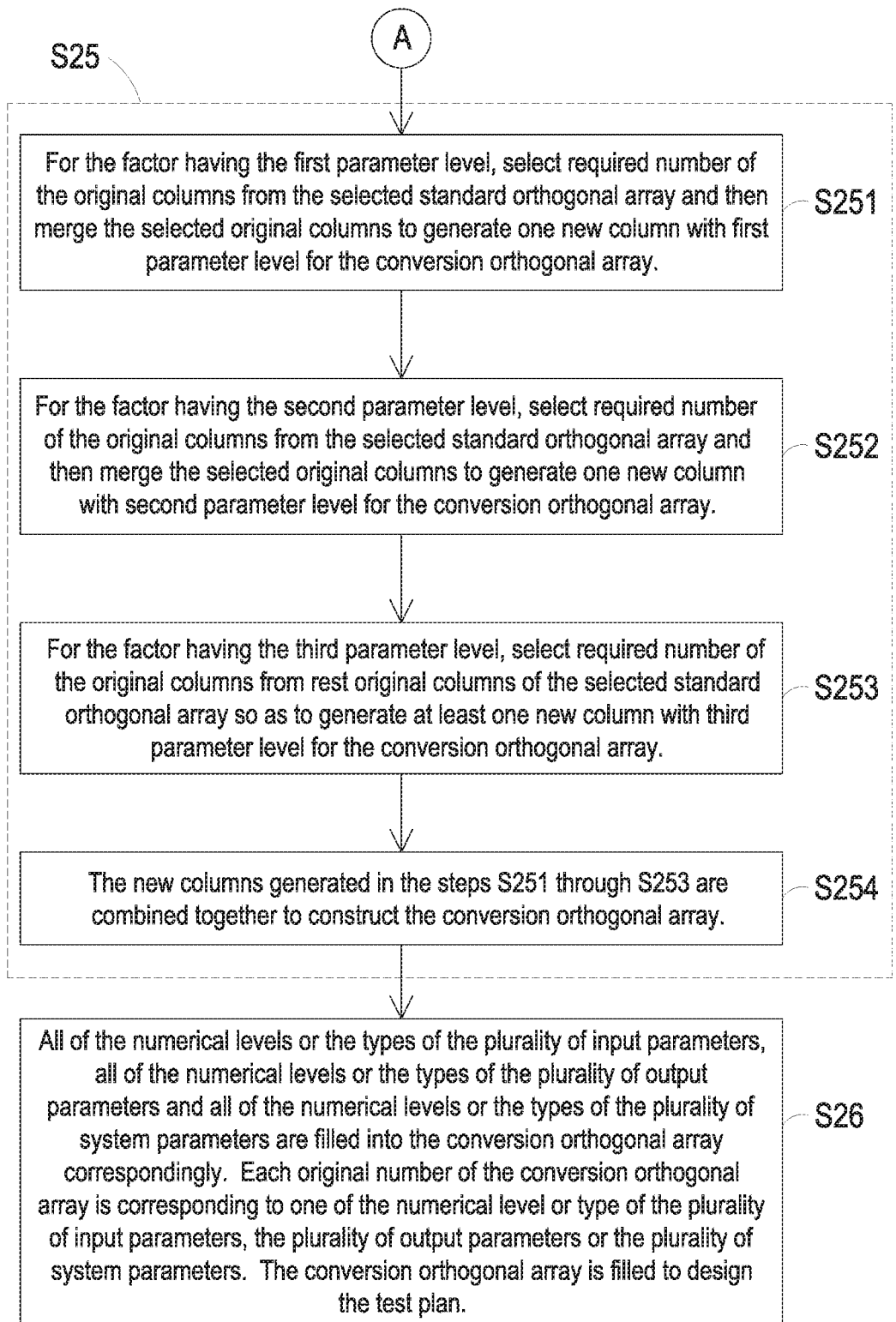

FIGS. 4A and 4B are flowcharts illustrating the sub-steps of the step S2 of FIG. 1. As shown in FIGS. 4A and 4B, firstly, a step S21 is performed. A standard orthogonal array is selected. In some embodiments, as shown in FIG. 3C, the standard orthogonal arrays are well-known and include but not limited to L4, L8, L9, L12, L16, L18, L27, L32, L36, L54, L64, L81 orthogonal arrays and etc. In this embodiment, the selected standard orthogonal array is preferably but not limited to a L64($2^{63}$) orthogonal array as shown in FIGS. 3D-1 through 3D-4. The selected standard orthogonal array identified as a L64($2^{63}$) has 64 original rows and 63 original columns with each column having two-level. Then, the number of the first parameter level, the number of the second parameter level and the number of the third parameter level are obtained according to the parameter levels of the plurality of input parameters, the plurality of output parameters and the plurality of system parameters. For example, the number of the 8-level factor is one, the number of 4-levle factors is ten, and the number of 2-level factors is five (see FIG. 3B). Namely, the number of factors is 16.

Then, a step S22 is performed. The number of the original columns of the selected standard orthogonal array demanded for the factor having the first parameter level is calculated according to the number of the first parameter level, the number of the original columns of the selected standard orthogonal array demanded for the factor having the second parameter level is calculated according to the number of the second parameter level, the number of the original columns of the selected standard orthogonal array demanded for the factor having the third parameter level is calculated according to the number of the third parameter level, and the number of the original columns of the selected standard orthogonal array demanded for all factors having the first parameter level, the second parameter level and the third parameter level are summed.

In some embodiments, the number of the original columns of the selected standard orthogonal array demanded for the factor having the first parameter level is calculated according to the Degree of freedom (DOF) associated with the factor having the first parameter level, the number of the original columns of the selected standard orthogonal array demanded for the factor having the second parameter level is calculated according to the DOF associated with the factor having the second parameter level, the number of the original columns of the selected standard orthogonal array demanded for the factor having the third parameter level is calculated according to the DOF associated with the factor having the third parameter level. The total number of the original columns of the selected standard orthogonal array demanded for all factors having the first parameter level, the second parameter level and the third parameter level is calculated according to the total required DOF associated with the factors. The total required DOF is determined by summarizing all the DOF associated with the factors having the first parameter level, the second parameter level and the third parameter level. Generally, the number of DOF associated with a factor is equal to or less than the number of level selected for the factor. Namely, as shown in FIG. 3B, the DOF of the 8-level factor is 7 (i.e. 8−1=7), and the total DOF for the one 8-level factor is 7 (i.e. the number of the 8-level factor X 7). The DOF of the 4-level factor is 3 (i.e. 4−1=3), and the total DOF for the ten 4-level factors is 30 (i.e. the number of the 4-level factor X 3). The DOF of the 2-level factor is 1 (i.e. 2−1=1), and the total DOF for the five 2-level factor is 5 (i.e. the number of the 2-level factor X 1). Therefore, the total required DOF for all factors is 42 (i.e. 7+30+5).

Then, a step S23 is performed. Compare whether the total number of the original columns of the selected standard orthogonal array demanded for the all factors calculated in the step S22 is lower than or equal to the number of the original columns of the selected standard orthogonal array. Namely, compare whether the total required DOF calculated in the step S22 is lower than or equal to the number of the original columns of the selected standard orthogonal array. If the total number of the original columns of the selected standard orthogonal array demanded for the all factors calculated in the step S22 (i.e. the total required DOF) is higher than the number of the original columns of the selected standard orthogonal array, a step S24 is performed to select another standard orthogonal array which is different with the standard orthogonal array selected in the step S21. Then, the above steps S22 through S23 are performed again. If the total number of the original columns of the selected standard orthogonal array demanded for the all factors calculated in the step S22 (i.e. the total required DOF) is lower than or equal to the number of the original columns of the selected standard orthogonal array (for example the total required DOF 42 is lower than the number of original columns 63), a step S25 is performed to convert and construct the conversion orthogonal array according to the selected standard orthogonal array. In an embodiment, the conversion orthogonal array comprises a plurality of columns and a plurality of rows.

In an embodiment, the step S25 includes the following steps. Firstly, in the step S251, for the factor having the first parameter level, select required number of the original columns from the selected standard orthogonal array by using an interaction table as shown in FIGS. 3D-1 through 3D-4 and then merge the selected original columns to generate one new column with first parameter level for the conversion orthogonal array. Preferably, the selected original columns of the selected standard orthogonal array intersect with each other according to the interaction table. For example, seven or six original columns of the selected standard orthogonal array are selected by using the interaction table and then merged to generate one new column with 8-level for the conversion orthogonal array, wherein the seven or six original columns of the selected standard orthogonal array intersect with each other. The step S251 is repeated until the required number of the columns having the first parameter level (i.e. one 8-level column) for the conversion orthogonal array is generated. Then, in the step S252, for the factor having the second parameter level, select required number of the original columns from rest original columns of the selected standard orthogonal array by using the interaction table and then merge the selected original columns to generate one new column with second parameter level for the conversion orthogonal array. Preferably, the selected original columns of the selected standard orthogonal array intersect with each other according to the interaction table. For example, three original columns of the selected standard orthogonal array are selected from the rest original columns by using the interaction table and then merged to generate one new column with 4-level for the conversion orthogonal array, wherein the three original columns of the selected standard orthogonal array intersect with each other. The step S252 is repeated until the required number of the columns having the second parameter level (i.e. ten 4-level columns) for the conversion orthogonal array is generated. Thereafter, in the step S253, for the factor having the third parameter level, select required number of the original columns from rest original columns of the selected standard orthogonal array by using the interaction table so as to generate at least one new column with third parameter level for the conversion orthogonal array. Preferably, the selected original columns of the selected standard orthogonal array are not mutually interactive with each other according to the interaction table. For example, five original columns of the selected standard orthogonal array are selected from the rest original columns by using the interaction table so as to generate five new columns with 2-level respectively for the conversion orthogonal array, wherein the five original columns of the selected standard orthogonal array are not mutually interactive with each other. Finally, in the step S254, the new columns generated in the steps S251 through S253 are combined together and then confirm whether all required columns are generated so as to construct the conversion orthogonal array as shown in FIG. 3F.

After the step S25 is performed, a step S26 is performed. The input parameters and their levels, the output parameters and their levels and the system parameters and their levels are assigned to corresponding columns of the conversion orthogonal array, so that all of the numerical levels or the types of the plurality of input parameters, all of the numerical levels or the types of the plurality of output parameters and all of the numerical levels or the types of the plurality of system parameters are filled into the conversion orthogonal array correspondingly. Each original number of the conversion orthogonal array is corresponding to one of the numerical level or type of the plurality of input parameters, the plurality of output parameters or the plurality of system parameters, so that the conversion orthogonal array is filled to design the test plan as shown in FIG. 3G.

Certainly, it is noted that the input parameters, the output parameters and the system parameters include not limited to three kinds of the parameters levels. The design and test method of the test plan of the present disclosure is also applied to the input parameters, the output parameters and the system parameters including more kinds of the parameters levels. The design and test method using the input parameters, the output parameters and the system parameters including more kinds of the parameters levels is similar to the design and test method using the input parameters, the output parameters and the system parameters including three kinds of the parameters levels, and is not redundantly described herein.

Figure 5:
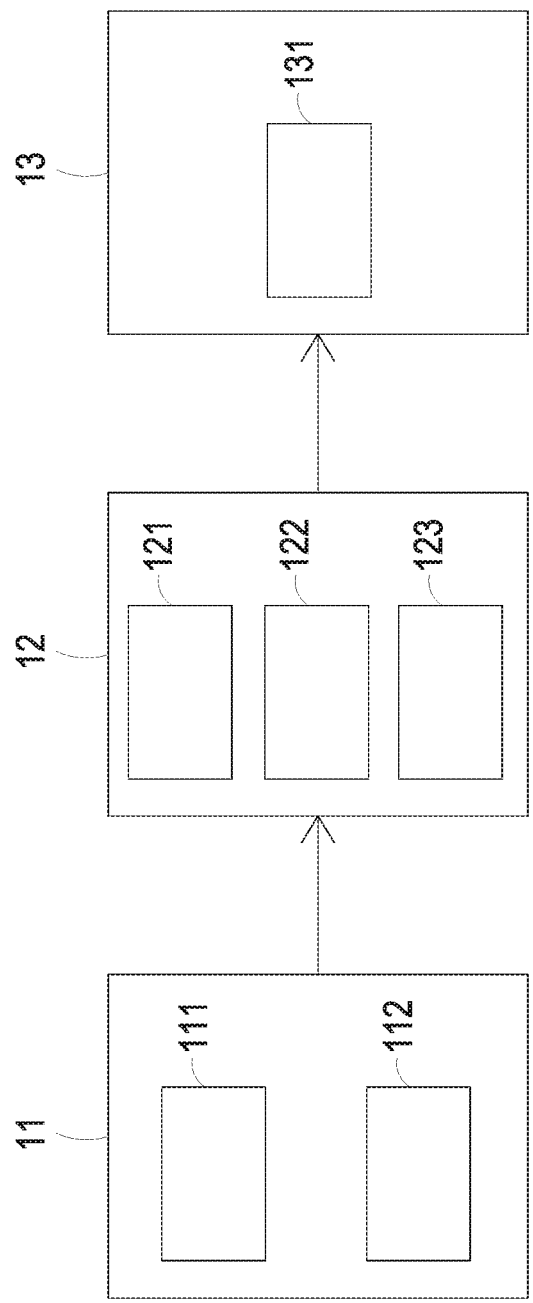
FIG. 5 is another schematic block diagram illustrating the test system applied to the design and test method of FIG. 1.

Taking the power supply tested by the test system 1 for example, the structure of the test system 1 is explained. As shown in FIG. 5, the input port 11 includes an input voltage sampling unit 111 and a power supply switch sampling unit 112. The input voltage sampling unit 111 is used to sample the level of the input voltage. The power supply switch sampling unit 112 is used to sample the switch state of the switch of the power supply. The system unit 12 includes an operation mode sampling unit 121, an environment parameter sampling unit 122 and a under test product 123. The operation mode sampling unit 121 is used to sample the state or the mode of the test system 1. For example, the operation mode sampling unit 121 is used to sample the hot-swap parameter and cold-swap parameter. The environment parameter sampling unit 122 is used to sample the characteristic parameter of the environment applied to the test system 1. For example, the characteristic parameter of the environment applied to the test system 1 is temperature. The under test product 123 is tested under the state or the mode sampled from the operation mode sampling unit 121 and the characteristic parameter of the environment sampled from the environment parameter sampling unit 122. The output port 13 includes an output load construction unit 131. The output load construction unit 131 is connected with an output load, or an output load is simulated with the output load construction unit 131 so that the characteristic parameter of the output load is obtained.

It is noted that the structure of the input port 11 of the test system 1 comprises but not limited to the input voltage sampling unit 111 and the power supply switch sampling unit 112. In some embodiments, the input port 11 further includes different kinds and different numbers of the sampling unit according to the sampling demand of the input port 11. The structure of the system unit 12 of the test system 1 includes but not limited to the operation mode sampling unit 121 and the environment parameter sampling unit 122. In some embodiments, the system unit 12 further includes different kinds and different numbers of the sampling unit according to the sampling demand of the system unit 12. The structure of the output port 13 includes but not limited to the output load construction unit 131. In some embodiments, the output port 13 further includes different kinds and different numbers of the sampling unit according to the sampling demand of the output port 13.

From the above descriptions, the method of the present disclosure creates the test plan including the plurality of input parameters, the plurality of output parameters, the plurality of system parameters, all of the numerical levels or the types of each input parameter, all of the numerical levels or the types of each output parameter and all of the numerical levels or the types of each system parameter. The test plan is performed on the product so as to obtain the analysis of the product. The conventional test method performs the test on the product with some specific parameters. Compared with the conventional test method, the design and test method of the present disclosure creates the test plan including a plurality of test cases to cover combination conditions including a great number of the input parameters, a great number of the output parameters, a great number of the system parameters and their dynamic cross of the parameters. Moreover, the design and test method of the present disclosure does not need to wait the test time for each test case to input the parameters. The design and test method of the present disclosure performs the test cases of the test plan on the product automatically by considering overall possibly parameters and their levels associated with the product. Consequently, the overall possibly parameters and their levels associated with the product can be tested before the product is dispatched to the customer. Therefore, the product quality in the market is enhanced significantly.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A design and test method of a test plan, which is performed on a product by a test system, the design and test method of the test plan comprising steps of:
   (a) accessing a plurality of input parameters received by the test system, a plurality of output parameters outputted by the test system and a plurality of system parameters associated with characteristic of the test system, wherein each of the plurality of input parameters, the plurality of output parameters and the plurality of system parameters comprises at least one numerical level or at least one type and comprises a corresponding parameter level according to the number of the numerical level or the number of the type thereof, respectively;
   (b) selecting a standard orthogonal array according to the number of the plurality of input parameters, the number of the plurality of output parameters, the number of the plurality of system parameters, the number of the numerical level or the type of each of the input parameters, the number of the numerical level or the type of each of the output parameters and the number of the numerical level or the type of each of the system parameters, editing or converting the selected standard orthogonal array to a conversion orthogonal array, and creating the test plan according to the conversion orthogonal array, wherein the test plan comprises the plurality of input parameters, the plurality of output parameters, the plurality of system parameters, every numerical level or every type of each of the input parameters, every numerical level or every type of each of the output parameters and every numerical level or every type of each of the system parameters, wherein the selected standard orthogonal array comprises a plurality of original columns and a plurality of original rows, wherein the test plan comprises at least one test case, which comprises the corresponding input parameter, the corresponding output parameter, the corresponding system parameter, the corresponding numerical level or the type of each of the input parameters, the corresponding numerical level or the type of each of the output parameters and the corresponding numerical level or the type of each of the system parameters, wherein an interaction between each of the original rows and each of the original columns of the selected standard orthogonal array comprises an original number, wherein when the number of the original columns of the selected standard orthogonal array is greater than the sum of the number of the input parameters, the number of the output parameters and the number of the system parameters, but a largest level of the original numbers contained in each of the original columns of the selected standard orthogonal array is lower than a largest level of the parameters levels of the input parameters, the output parameters and the system parameters, the selected standard orthogonal array is converted to the conversion orthogonal array;
   (c) creating a corresponding execution program according to each of the test case of the test plan and executing each of the execution program, so that the test case of the test plan corresponding to the execution program is performed on the product, wherein the test case including the input parameter, the output parameter, the system parameter, the numerical level or the type of each of the input parameters, the numerical level or the type of each of the output parameters and the numerical level or the type of each of the system parameters is performed on the product so as to obtain and collect an operation data and a state report of the product; and (d) creating a test result according to the operation data and the state report, and allowing the test result to be visible so as to obtain a test analysis and a default analysis of the product.

2. The design and test method of the test plan according to claim 1, wherein in the step (a), the plurality of input parameters comprise input source, input mode, input voltage, swing rate, turn-on time, turn-off time, switch cycle, switch mode of a switch of a power supply and input frequency.

3. The design and test method of the test plan according to claim 1, wherein in the step (a), the plurality of output parameters comprise output mode, output load and output dynamic condition, wherein the output dynamic condition comprises cycle, frequency and current swing rate.

4. The design and test method of the test plan according to claim 1, wherein in the step (a), the plurality of system parameters comprise temperature, hot-swap parameter and cold-swap parameter.

5. The design and test method of the test plan according to claim 1, wherein the conversion orthogonal array comprises a plurality of columns, and in the step (b), each of the plurality of input parameters, the plurality of output parameters and the plurality of system parameters is assigned to the corresponding column of the conversion orthogonal array.

6. The design and test method of the test plan according to claim 1, wherein the conversion orthogonal array comprises a plurality of rows, and in the step (b), each of the rows of the conversion orthogonal array construct the corresponding test case of the test plan.

7. The design and test method of the test plan according to claim 1, wherein the step (b) further comprises the steps of:
(b1) selecting the standard orthogonal array and calculating the number of a first parameter level, the number of a second parameter level and the number of a third parameter level according to the parameter levels of the plurality of input parameters, the plurality of output parameters and the plurality of system parameters;
(b2) the number of the original columns of the selected standard orthogonal array demanded for the parameter having the first parameter level is calculated according to the number of the first parameter level, the number of the original columns of the selected standard orthogonal array demanded for the parameter having the second parameter level is calculated according to the number of the second parameter level, the number of the original columns of the selected standard orthogonal array demanded for the parameter having the third parameter level is calculated according to the number of the third parameter level, and the number of the original columns of the selected standard orthogonal array demanded for all the parameters having the first parameter level, the second parameter level and the third parameter level are summed;
(b3) comparing whether the number of the original columns of the selected standard orthogonal array demanded for all the parameters having the first parameter level, the second parameter level and the third parameter level is lower than or equal to the number of the original columns of the selected standard orthogonal array; and
(b4) if the number of the original columns of the selected standard orthogonal array demanded for all the parameters having the first parameter level, the second parameter level and the third parameter level is higher than the number of the original columns of the selected standard orthogonal array, selecting another standard orthogonal array which is different with the standard orthogonal array selected in the step (b1) and performing the steps (b1) through (b3); and
(b5) if the number of the original columns of the selected standard orthogonal array demanded for all the parameters having the first parameter level, the second parameter level and the third parameter level is lower than or equal to the number of the original columns of the selected standard orthogonal array, converting and constructing the conversion orthogonal array according to the selected standard orthogonal array.

8. The design and test method of the test plan according to claim 7, wherein the level of the first parameter level is different from the level of the second parameter level and the level of the third parameter level, and the level of the second parameter level is different from the level of the third parameter level.

9. The design and test method of the test plan according to claim 7, wherein the step (b5) further comprises the steps of:
(b51) for the parameter having the first parameter level, selecting required number of the original columns from the selected standard orthogonal array and then merging the selected original columns to generate one new column with the first parameter level for the conversion orthogonal array;
(b52) for the parameter having the second parameter level, selecting required number of the original columns from rest original columns of the selected standard orthogonal array and then merging the selected original columns to generate one new column with the second parameter level for the conversion orthogonal array;
(b53) for the parameter having the third parameter level, selecting required number of the original columns from rest original columns of the selected standard orthogonal array so as to generate at least one new column with the third parameter level for the conversion orthogonal array; and
(b54) combining the new columns generated in the steps (b51) through (b53) together to construct the conversion orthogonal array.

10. The design and test method of the test plan according to claim 7, wherein the step (b) further comprises a step (b6) of allowing the plurality of input parameters, the plurality of output parameters and the plurality of system parameters to be assigned to the corresponding columns of the conversion orthogonal array, so that all of the numerical levels or the types of the plurality of input parameters, all of the numerical levels or the types of the plurality of output parameters and all of the numerical levels or the types of the plurality of system parameters are filled into the conversion orthogonal array correspondingly to create the test plan.

* * * * *

UNITED STATES PATENT AND TRADEMARK OFFICE
CERTIFICATE OF CORRECTION

| | | |
|---|---|---|
| PATENT NO. | : 11,436,115 B2 | Page 1 of 1 |
| APPLICATION NO. | : 16/541567 | |
| DATED | : September 6, 2022 | |
| INVENTOR(S) | : Chin Huat Lim et al. | |

It is certified that error appears in the above-identified patent and that said Letters Patent is hereby corrected as shown below:

On the Title Page

Item [54], and in the Specification Column 1 Line 1 change the title from "TEST METHOD OF TEST PLAN" to read "DESIGN AND TEST METHOD OF TEST PLAN"

Signed and Sealed this
Eighteenth Day of October, 2022

*Katherine Kelly Vidal*

Katherine Kelly Vidal
*Director of the United States Patent and Trademark Office*